United States Patent
Lioi

(10) Patent No.: US 9,438,022 B2
(45) Date of Patent: Sep. 6, 2016

(54) MODULAR DEVICE FOR PROTECTING CABLES AND CONDUITS

(71) Applicant: Tri-Flex of Ohio, Inc., North Canton, OH (US)

(72) Inventor: Paul Lioi, North Canton, OH (US)

(73) Assignee: Tri-Flex of Ohio, Inc., North Canton, OH (US)

( * ) Notice: Subject to any disclaimer, the term of this patent is extended or adjusted under 35 U.S.C. 154(b) by 44 days.

(21) Appl. No.: 14/606,755

(22) Filed: Jan. 27, 2015

(65) Prior Publication Data

US 2015/0214704 A1 Jul. 30, 2015

Related U.S. Application Data

(60) Provisional application No. 61/932,331, filed on Jan. 28, 2014.

(51) Int. Cl.
*H02G 3/34* (2006.01)

(52) U.S. Cl.
CPC ....................................... *H02G 3/34* (2013.01)

(58) Field of Classification Search
USPC ............................................... 174/99 R, 97
See application file for complete search history.

(56) References Cited

U.S. PATENT DOCUMENTS

| 5,095,822 | A | 3/1992 | Martin |
| 5,777,266 | A | 7/1998 | Herman et al. |
| 6,202,565 | B1 | 3/2001 | Henry |
| 6,448,497 | B1 | 9/2002 | McCracken et al. |
| 6,499,410 | B1 | 12/2002 | Berardi |
| 6,878,881 | B1 | 4/2005 | Henry |
| 7,145,079 | B1 * | 12/2006 | Henry ................. H02G 3/0418 104/275 |
| 7,309,836 | B2 | 12/2007 | Lubanski |
| 7,394,025 | B1 | 7/2008 | Wong |
| 7,939,759 | B2 | 5/2011 | Henry |
| 8,119,914 | B2 | 2/2012 | Lubanski |
| 8,288,652 | B2 * | 10/2012 | Lubanski ............... H02G 9/025 104/275 |

* cited by examiner

*Primary Examiner* — Dhirubhai R Patel
(74) *Attorney, Agent, or Firm* — Edwin A. Sisson, Attorney at Law, LLC; Jeffrey J. Banyas

(57) ABSTRACT

This specification discloses a modular device for protecting cables and conduits includes cable and conduit protector sections. Each cable and conduit protector section includes a channel, a first ramp, a second ramp and a lid. The channel further includes a bottom, a first side, a second side and plurality of cross members including a first end cross member and a second end cross member, the first ramp is connected to the channel first side and the second ramp is connected to the channel second side. The lid preferably has an arched shape running the length of the channel and is connected to the channel second side.

20 Claims, 15 Drawing Sheets

MODULAR DEVICE FOR PROTECTING CABLES AND CONDUITS

CROSS REFERENCES AND PRIORITIES

This patent application claims the priority from U.S. Provisional Patent Application No. 61/932,331 filed on 28 Jan. 2014 the teachings of which are hereby incorporated by reference in their entirety.

BACKGROUND

Protecting cables and conduits from being driven over by heavy equipment at construction, excavation, mining, drilling and fracking sites is a common problem. One can envision the damage caused by repeatedly driving over important cables and conduits with heavy equipment such as large trucks, excavators, flat beds and the like. One particular danger is the risk that high pressure conduits, such as nitrogen conduits, might rupture due to the damage caused by being driven over with heavy equipment. On the other hand, it is also important on job sites to maintain access to cables and conduits so that they may be quickly repaired, replaced, moved or rerouted as needed.

Many solutions have been proposed that protect cables and conduits from the damage caused by being driven over while at the same time allowing access to the cables and conduits. The simplest of these is to lay sections of metal, plastic or other rigid material over the cables and conduits. One such system is described in U.S. Pat. No. 6,202,565 to Henry ("U.S. '565"). To gain access to the cables and conduits an entire section of the rigid material must be removed.

A similar approach is proposed in U.S. Pat. No. 6,878,811 to Henry ("U.S. '811") which discloses a modular cable protector assembly comprised of side ramps, tunnel members and tunnel connectors. The tunnel member and tunnel connector of each individual modular section in U.S. '811 are individual components which require assembly at each section.

Another solution proposed in the prior art is to encase the cables and conduits in a box made of a rigid material that can be driven over by heavy equipment without damaging the cables and conduits.

U.S. Pat. No. 5,095,822 to Martin ("U.S. '822") discloses one such box system comprised of modular sections comprising a solid body of elastomeric material with ramps on opposing sides. The box of U.S. '822 is not covered where the cables are placed.

U.S. Pat. No. 5,777,266 to Herman et al. ("U.S. '266") discloses a modular cable protection system comprised of sections of molded plastic material which encase electrical cables, fluid hoses and data cables and can be interlocked to form an entire cable protection system. Once in place, ramps are connected to the edge of each section of the box using a male and female connector to allow equipment to drive over the box.

U.S. Pat. No. 6,448,497 to McCracken et al. ("U.S. '497") discloses a device for housing cables and conduits comprised of interconnectable channel members formed of pliable elastomers each of which contain a number of small channels where the cables or conduits are disposed. U.S. '497 further discloses removable cover members that fit over the interconnectable channel members. The removable cover member is screwed into the interconnectable channel member as shown in FIG. 3 of U.S. '497.

U.S. Pat. No. 6,499,410 to Berardi ("U.S. '410") discloses a cable crossover protector with an illumination device. The cable crossover protector of U.S. '410 has a flat lid and a solid bottom.

U.S. Pat. No. 7,309,836 to Lubanski ("U.S. '836") discloses a ramp system for protecting cables with a plurality of channels extending between the opposing ends of the ramps. The ramps and channels of each modular section of U.S. '836 come as separate pieces which must be assembled on site.

U.S. Pat. No. 7,394,025 to Wong ("U.S. '025") discloses an apparatus for protecting cables from traffic damage comprising a plurality of double-ended protectors interconnected by flexible connector structures. Each double-ended protector in U.S. '025 has a single, small channel for cables to run through, and a cover is then placed over the channel.

U.S. Pat. No. 7,939,759 to Henry ("U.S. '759") discloses a cable protector with a main recessed channel and a lid where a plurality of dividers are inserted into the main recessed channel to form a plurality of smaller channels for cables to be inserted into. In U.S. '759 the lid is a flat lid and the dividers serve the additional purpose of strengthening the lid.

U.S. Pat. No. 8,119,914 to Lubanski ("U.S. '914") discloses a cable protector comprised of a channel member, and a plurality of channels. The channel member has a solid bottom and the plurality of channels are covered by a flat lid.

There exists a need for a cable and conduit protection system which is strong enough to withstand being driven over by heavy equipment, provides sufficient protection against dirt, debris and other elements and allows for easy access to the cables and conduits protected therein.

SUMMARY

Disclosed in this specification is a cable and conduit protector comprising (1) a channel comprising a channel bottom, a first channel side comprising a plurality of first channel side connecting holes, a second channel side comprising a plurality of second channel side connecting holes, a plurality of cross members with each cross member of the plurality of cross members comprising a plurality of grooves, a first end cross member comprising a plurality of first end cross member grooves and a plurality of first end cross member connecting holes, and a second end cross member comprising a plurality of second end cross member grooves and a plurality of second end cross member connecting holes, (2) a first ramp comprising a first ramp channel, a first ramp sidewall, a first ramp inclined wall, a first ramp connecting tube and a plurality of first ramp connecting holes passing through the first ramp connecting tube and the first ramp sidewall, (3) a second ramp comprising a second ramp channel, a second ramp sidewall and a second ramp inclined wall, a second ramp connecting tube and a plurality of second ramp connecting holes passing through the second ramp connecting tube and the second ramp sidewall, and (4) a lid having a lid length an arched shape running the length of the channel, and the lid is connected to the second channel side.

In one embodiment the channel further comprises a plurality of drainage holes. The plurality of drainage holes may be located in the channel bottom, the first channel side, the second channel side, the first end cross member, the second end cross member or any combination thereof.

In one embodiment the channel further comprises a plurality of affixing holes. In a preferred embodiment the plurality of affixing holes are located in the channel bottom.

In one embodiment the channel further comprises at least one section of cable comprising a cable first end and a cable second end. In another embodiment the channel further comprises at least one section of conduit comprising a conduit first end and a conduit second end. In a preferred embodiment the at least one section of cable comprises a first cable connector located at the cable first end and a second cable connector located at the cable second end. In a preferred embodiment the at least one section of conduit comprises a first conduit connector located at the conduit first end and a second conduit connector located at the conduit second end.

In one embodiment there is more than one first ramp. In a further embodiment there is more than one second ramp. In still a further embodiment there is more than one lid.

In one embodiment the first ramp, the second ramp, the lid or any combination thereof further comprises a grip enhancing surface. In a preferred embodiment the grip enhancing surface is a diamond plate surface.

In one embodiment the channel, the first ramp, the second ramp and the lid are each fabricated from a type of material selected from the group consisting of cast iron, steel, stainless steel, aluminum, titanium, rubber, plastic or composite materials. In one embodiment the channel, the lid, the first ramp and the second ramp are fabricated from the same type of material. In a preferred embodiment the channel and the lid are fabricated from the same type of material, and the first ramp and the second ramp are fabricated from a different type of material than the channel and the lid are fabricated from.

In one embodiment the lid further comprises a handle. In a preferred embodiment the handle is recessed into a connected to the lid. In another embodiment the handle is a hole.

In one embodiment the lid is connected to the channel second side by a hinge.

In one embodiment the first ramp sidewall is connected to the first channel side by a plurality of first ramp nuts and bolts passing through the first channel side connecting holes and the first ramp connecting holes. In another embodiment the second ramp sidewall is connected to the second channel side by a plurality of second ramp nuts and bolts passing through the second channel side connecting holes and the second ramp connecting holes.

In one embodiment two or more cable and conduit protectors are connected by a nut and bolt passing through the first end cross member connecting hole of one cable and conduit protector and the second end cross member connecting hole of a second cable and conduit protector to form a modular cable and conduit protection system. In a preferred embodiment the nut and bolt is a "U" shaped dual bolt adjoined by a plate.

DETAILED DESCRIPTION

Figure 1:
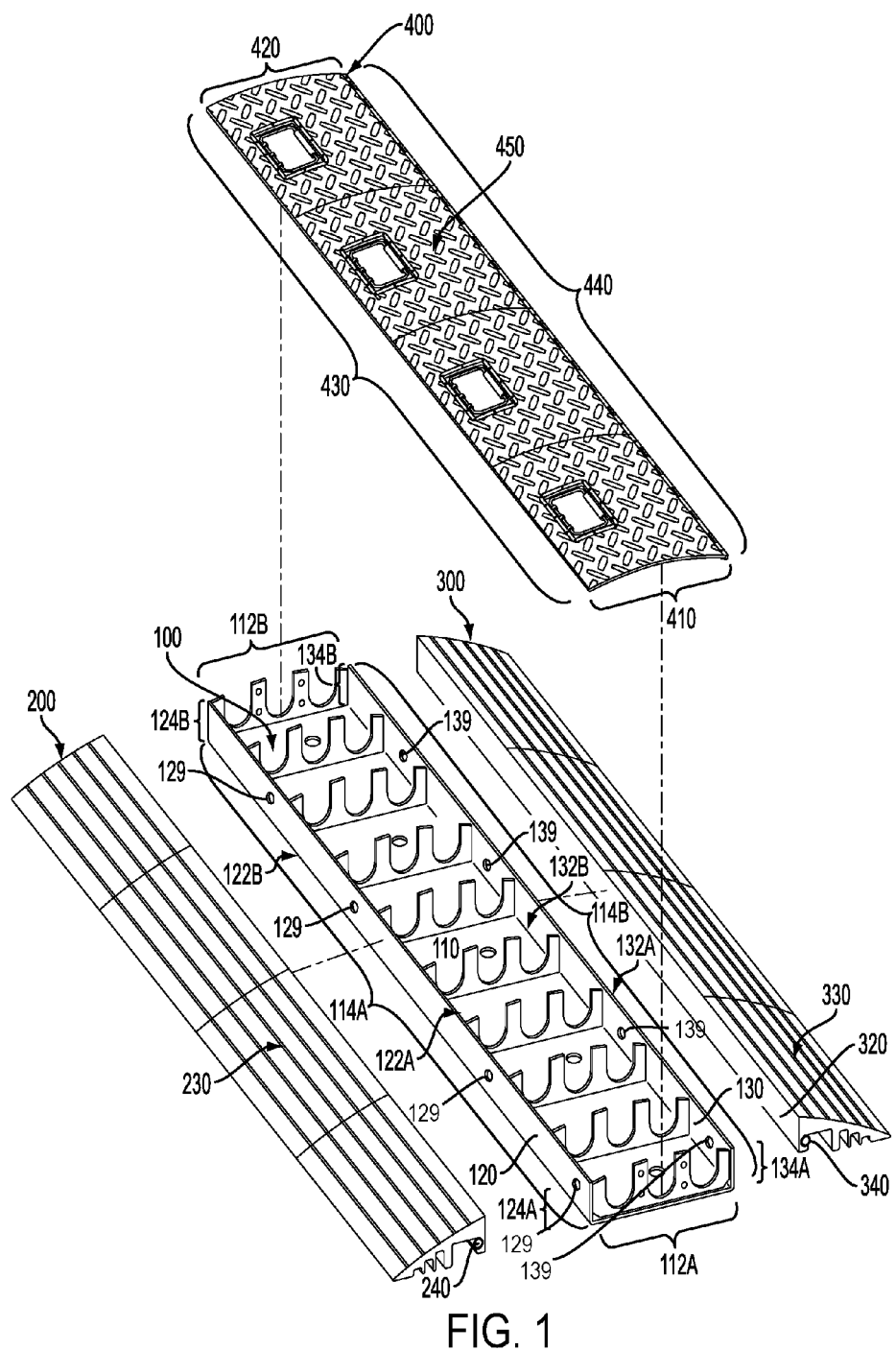
FIG. 1 is an exploded perspective view of a cable and conduit protector section.
Figure 2:
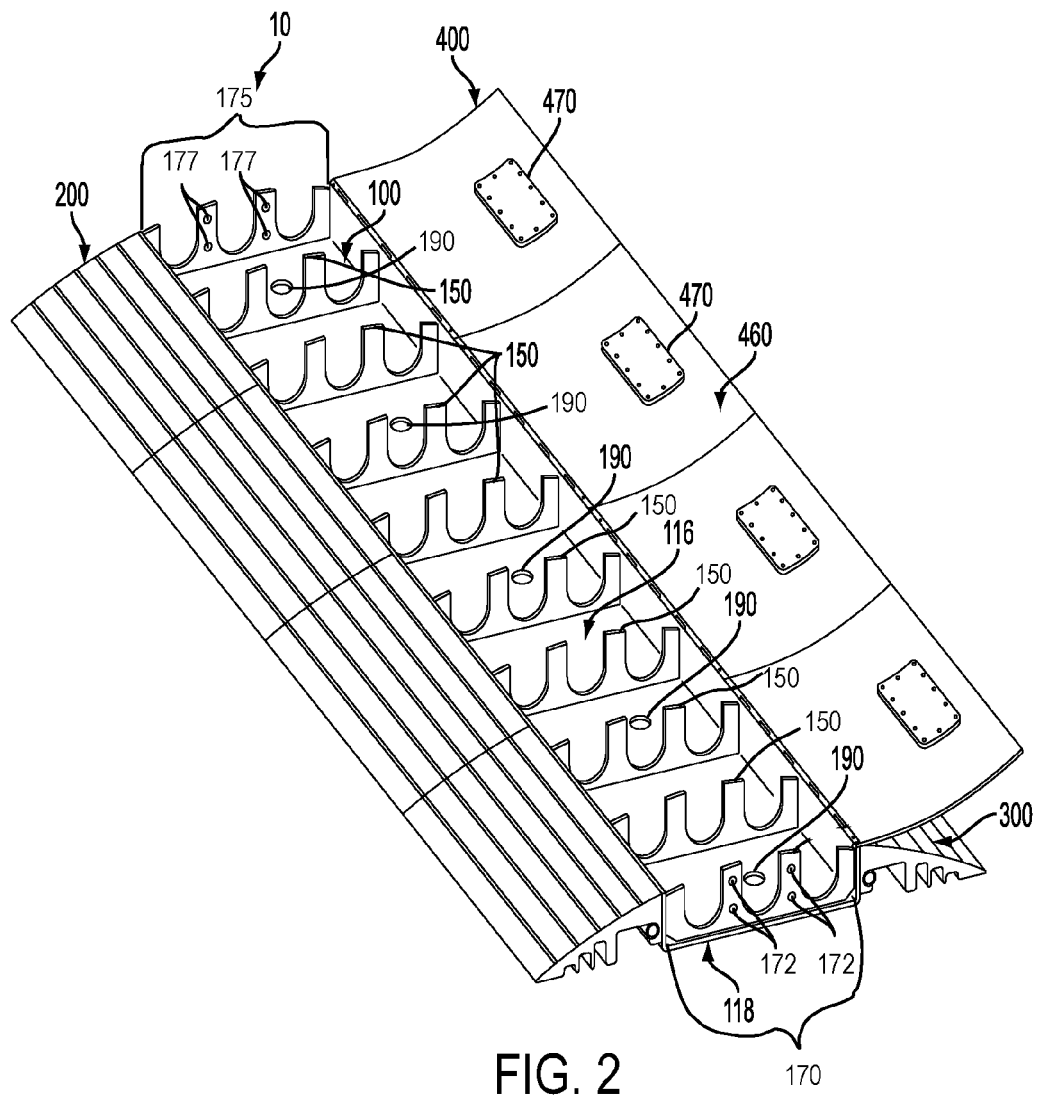
FIG. 2 is a perspective view of one embodiment of a cable and conduit protector section.
Figure 9:
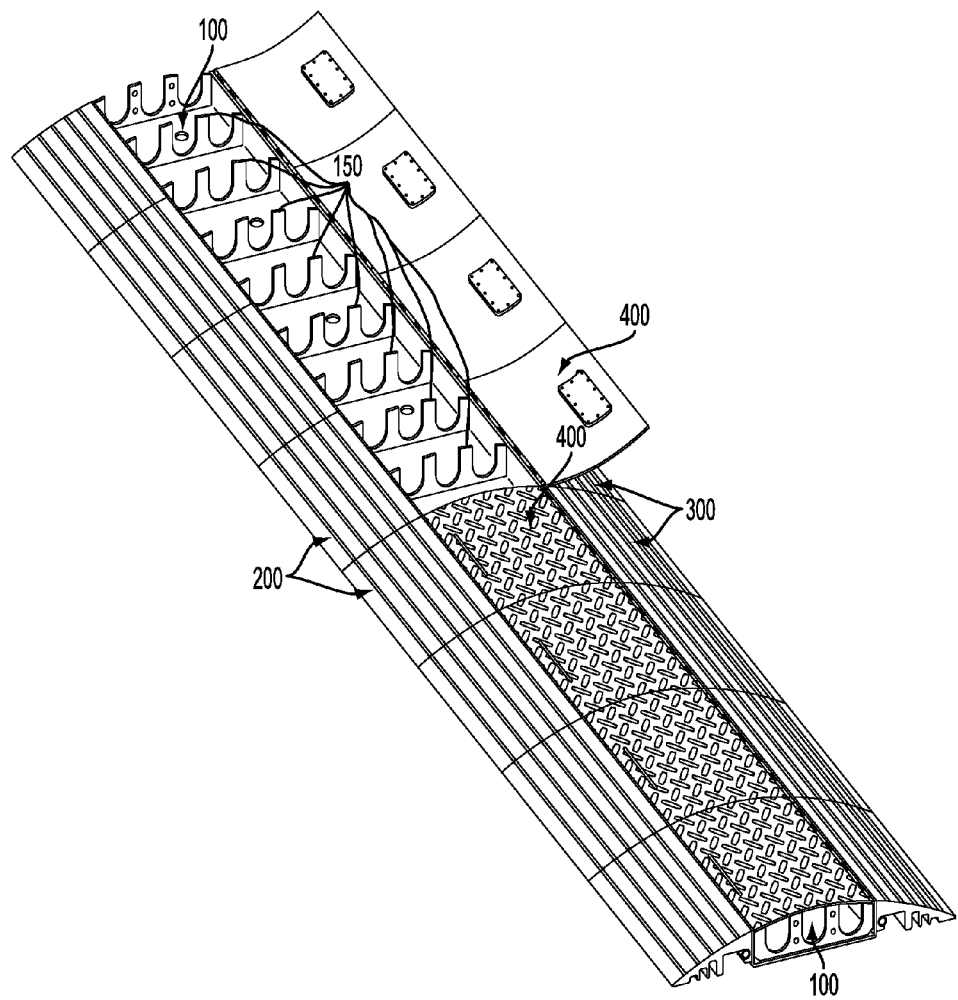
FIG. 9 is a perspective view of an assembled modular cable and conduit protection system.
Figure 10:
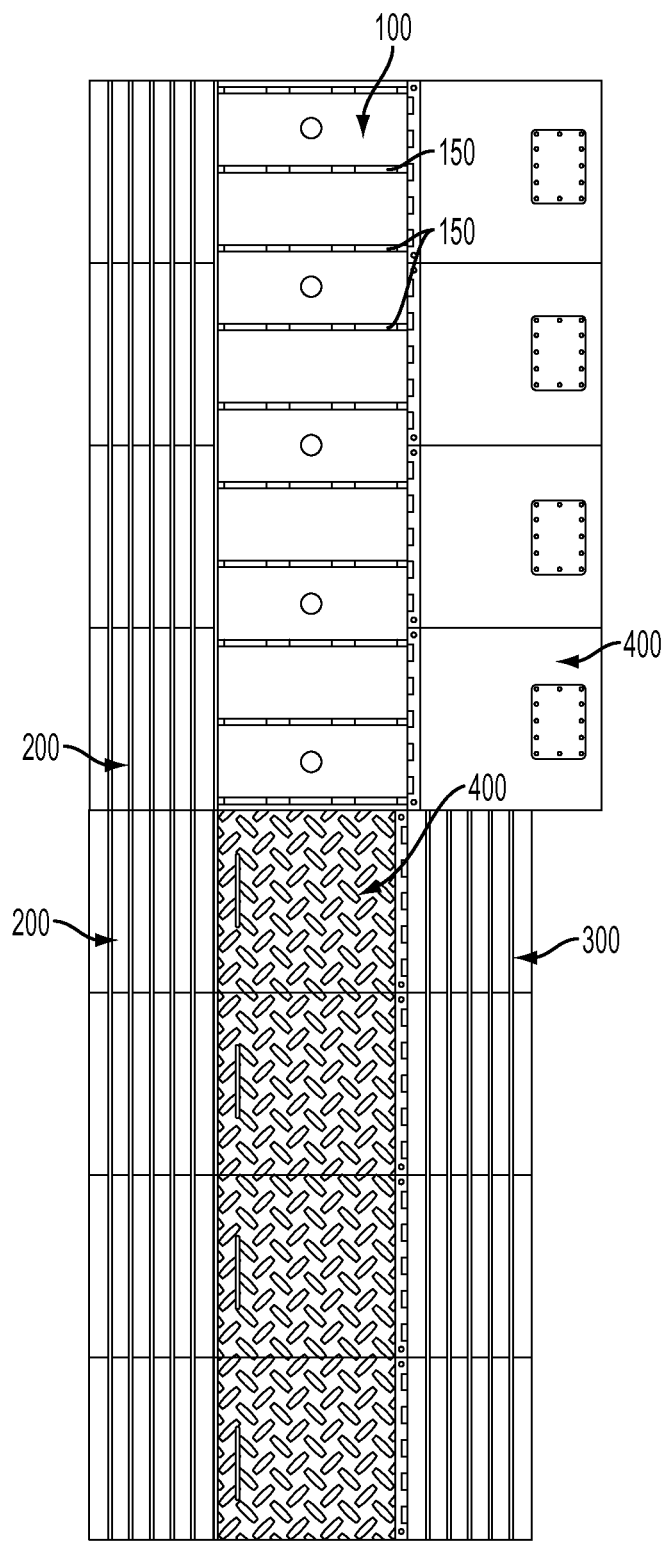
FIG. 10 is an overhead view of an assembled modular cable and conduit protection system.

This specification discloses a modular cable and conduit protection system comprising a plurality of cable and conduit protector modular sections (10) as shown in FIG. 2. Each cable and conduit protector modular section comprises a channel (100), a first ramp (200), a second ramp (300) and a lid (400). The modular cable and conduit protection system is assembled by connecting two or more of the cable and conduit protector modular sections together as shown in FIG. 9.

In one embodiment the channel comprises a bottom (110), two sides and a plurality of cross members (150). In one embodiment the channel bottom lies in a plane substantially parallel to the ground and is preferably rectangular in shape. The channel bottom comprises a first end (112A), a second end (112B), a first edge (114A), a second edge (114B), a top surface (116) and a bottom surface (118) with the first end being opposite of the second end and adjacent to the first edge and the second edge.

In one embodiment the channel first side (120) has a rectangular shape having a top edge (122A), a bottom edge (122B), a first height edge (124A), a second height edge (124B), an outer surface (126) and an inner surface (128). The channel first side preferably comprises a plurality of connecting holes (129) passing from the outer surface of the first side through the inner surface of the first side. The bottom edge of the channel first side is joined in a unitary manner or connected to the first edge of the channel bottom, and the channel first side extends vertically therefrom in a plane that is substantially perpendicular to the channel bottom. As used herein and in the claims the phrase "joined in a unitary manner" means the components are affixed in a manner that cannot be disassembled by mechanical means (i.e. welding, injection molding, compression molding, pultrusion molding and the like). As used herein and in the claims the term "connected" means any connection which fastens two or more components together such that they can be separated by mechanical means (i.e. nuts and bolts, screws, rivets, pins, ties and the like).

In one embodiment the channel second side (130) has a rectangular shape having a top edge (132A), a bottom edge (132B), a first height edge (134A), a second height edge (134B) an outer surface (136) and an inner surface (138). The channel second side preferably comprises a plurality of connecting holes (139) passing from the outer surface of the second side through the inner surface of the second side. The bottom edge of the channel second side is joined in a unitary manner or connected to the second edge of the channel bottom, and the channel second side extends vertically therefrom in a plane that is substantially perpendicular to the channel bottom and parallel to the channel first side.

Figure 6:
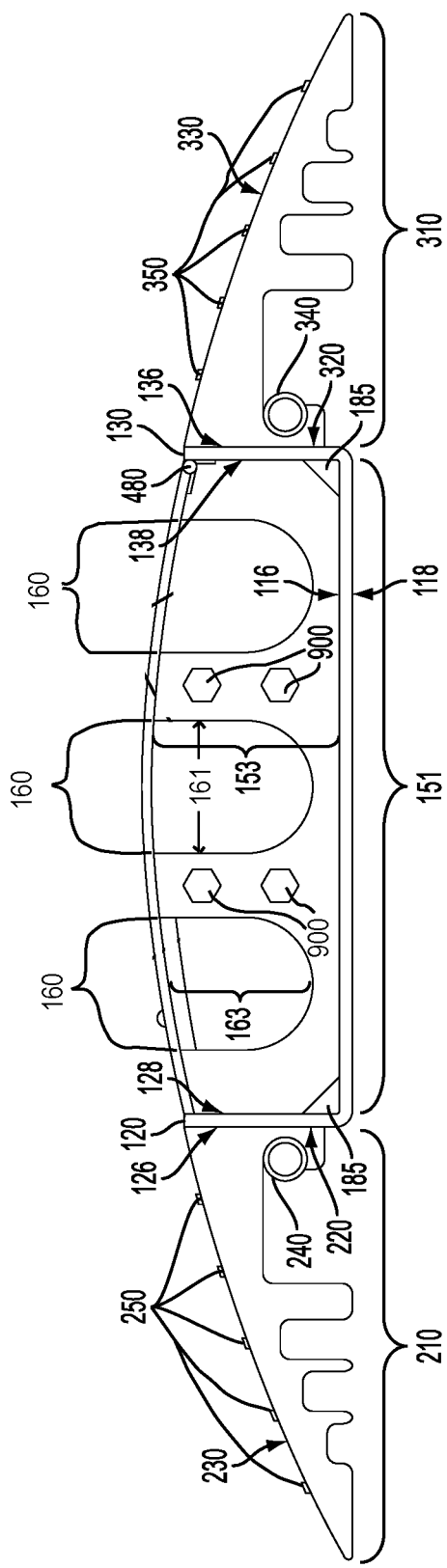
FIG. 6 is an end view of a cable and conduit protector section.
Figure 7:
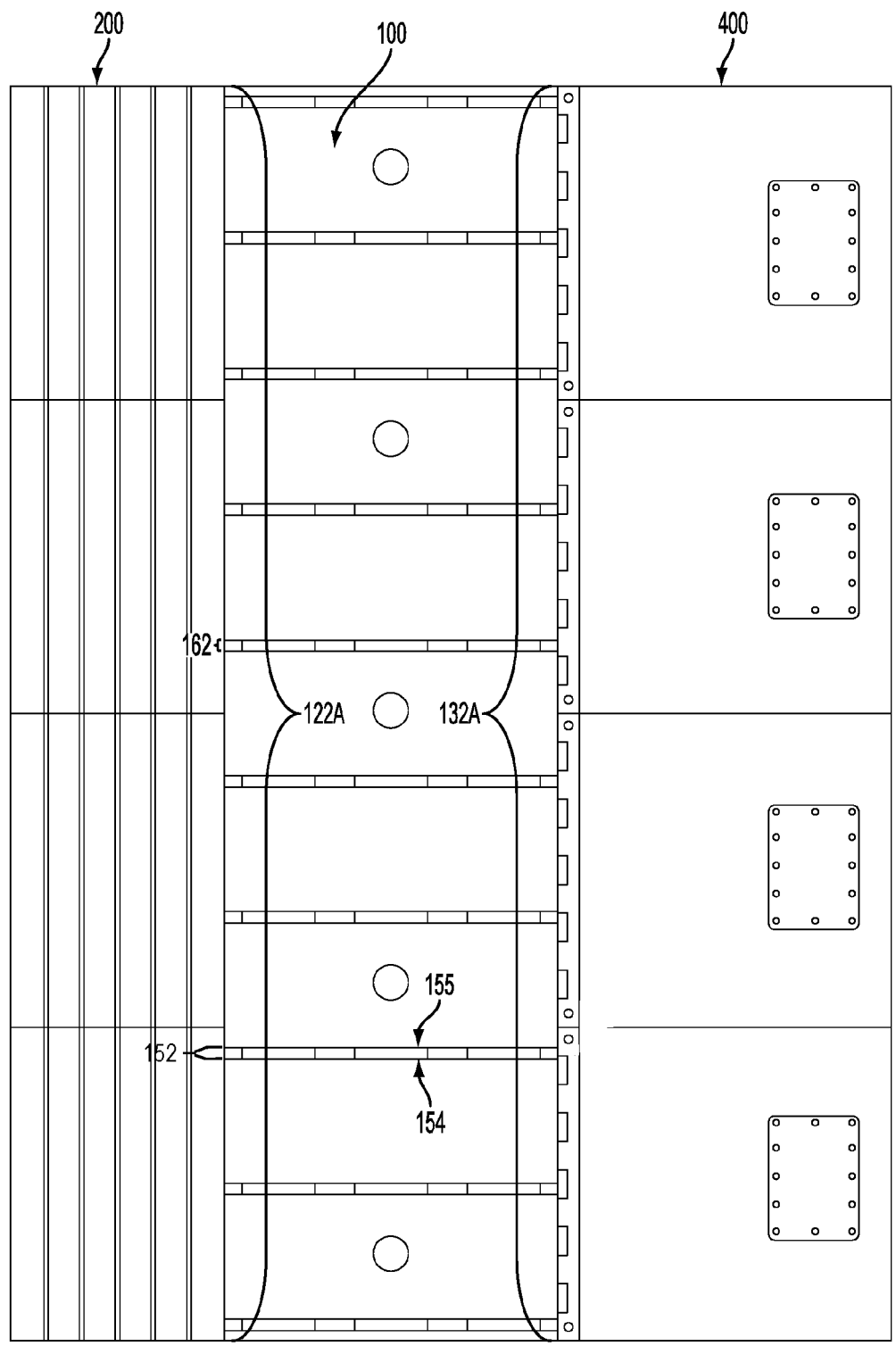
FIG. 7 is an overhead view of one embodiment of a cable and conduit protector section.
Figure 8:
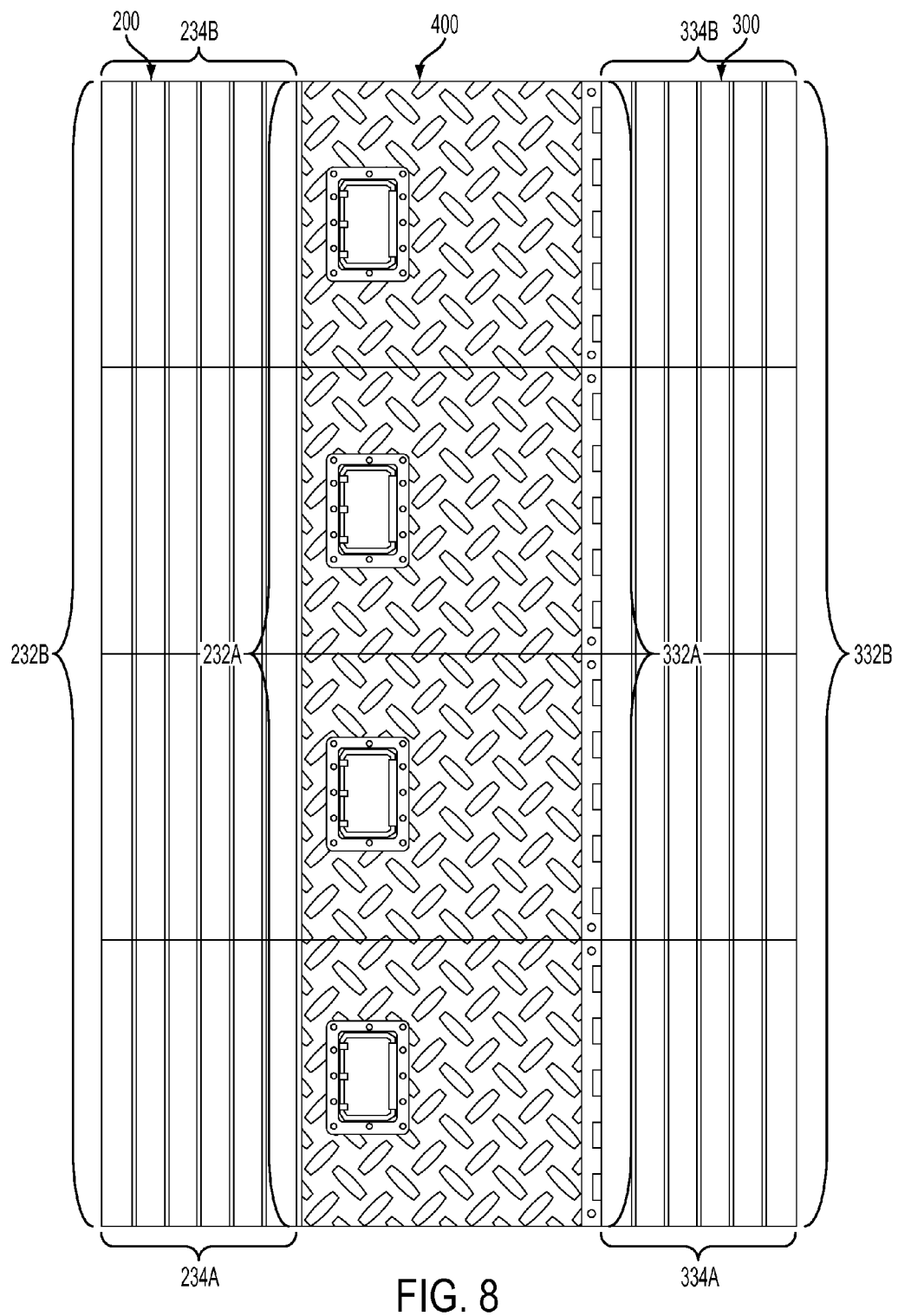
FIG. 8 is an overhead view of one embodiment of a cable and conduit protector section.

In one embodiment the plurality of cross members (150) are spaced intermittently within the channel and spanning the distance between the channel first side and the channel second side. Each cross member of the plurality of cross members has a length dimension (151), a width dimension (152), a height dimension, a front side (154) and a back side (155). The length dimension of each cross member is preferably the same as or similar to the dimension of the channel bottom first end and the channel bottom second end. In a preferred embodiment the height dimension of each cross member corresponds to the distance between the top surface of the channel bottom and the bottom side of the lid. The width dimension of each cross member is the shortest dimension and corresponds to the thickness of the cross member. Each cross member of the plurality of cross members is inserted into the channel in a vertical plane that is adjacent to the channel bottom, the first channel side and the second channel side, and is preferably joined in a unitary manner or connected to the channel bottom top surface, the channel first side inner surface and the channel second side inner surface as seen in FIG. 6.

Figure 11:
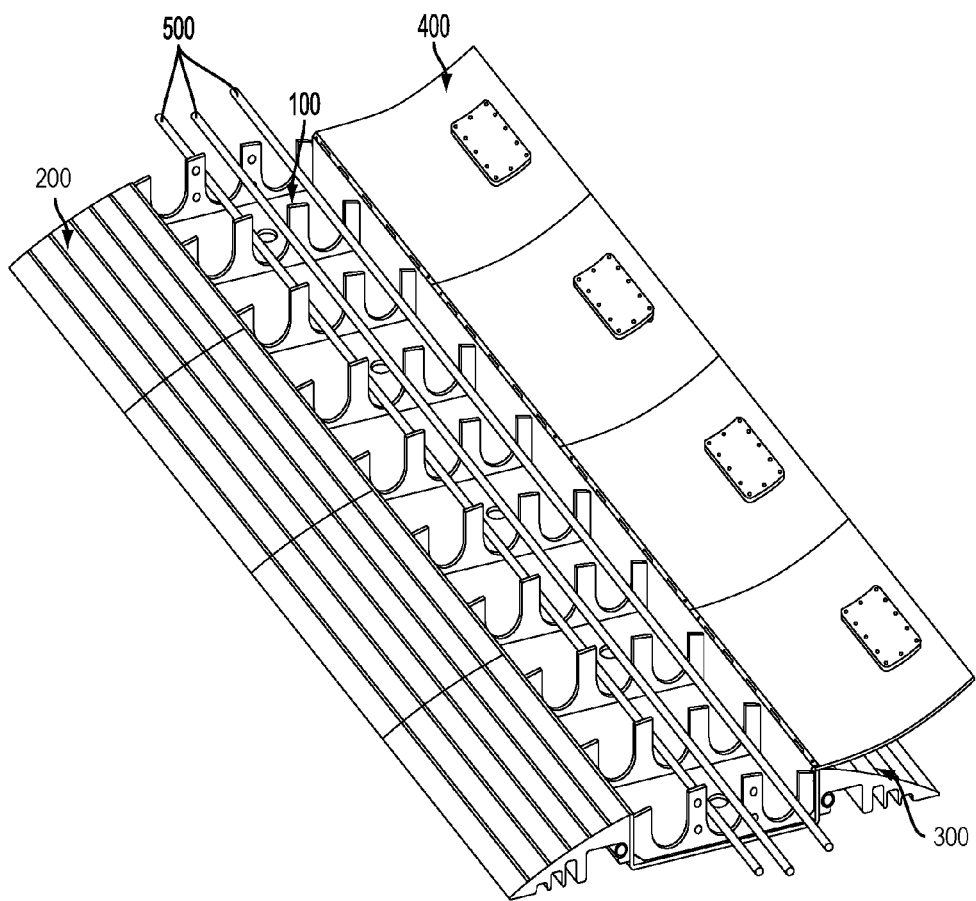
FIG. 11 is a perspective view of one embodiment of a cable and conduit protector section.
Figure 12:
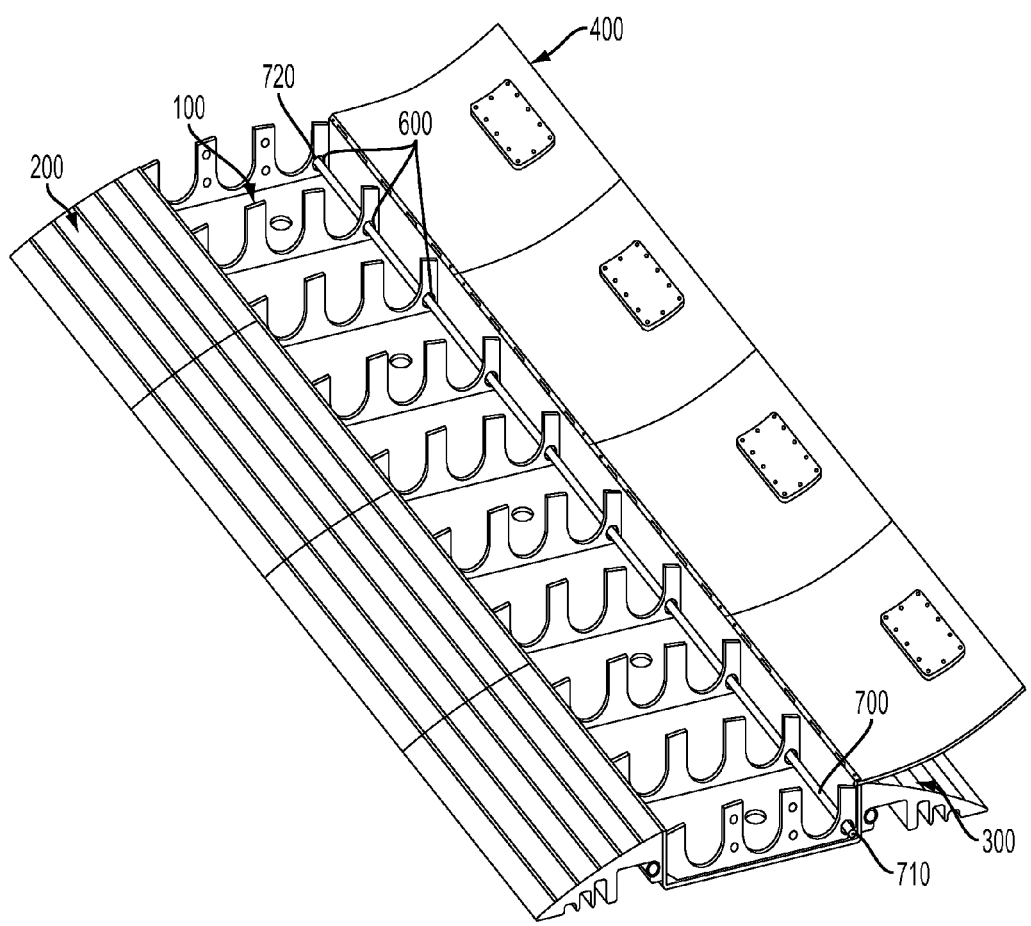
FIG. 12 is a perspective view of one embodiment of a cable and conduit protector section.
Figure 13:
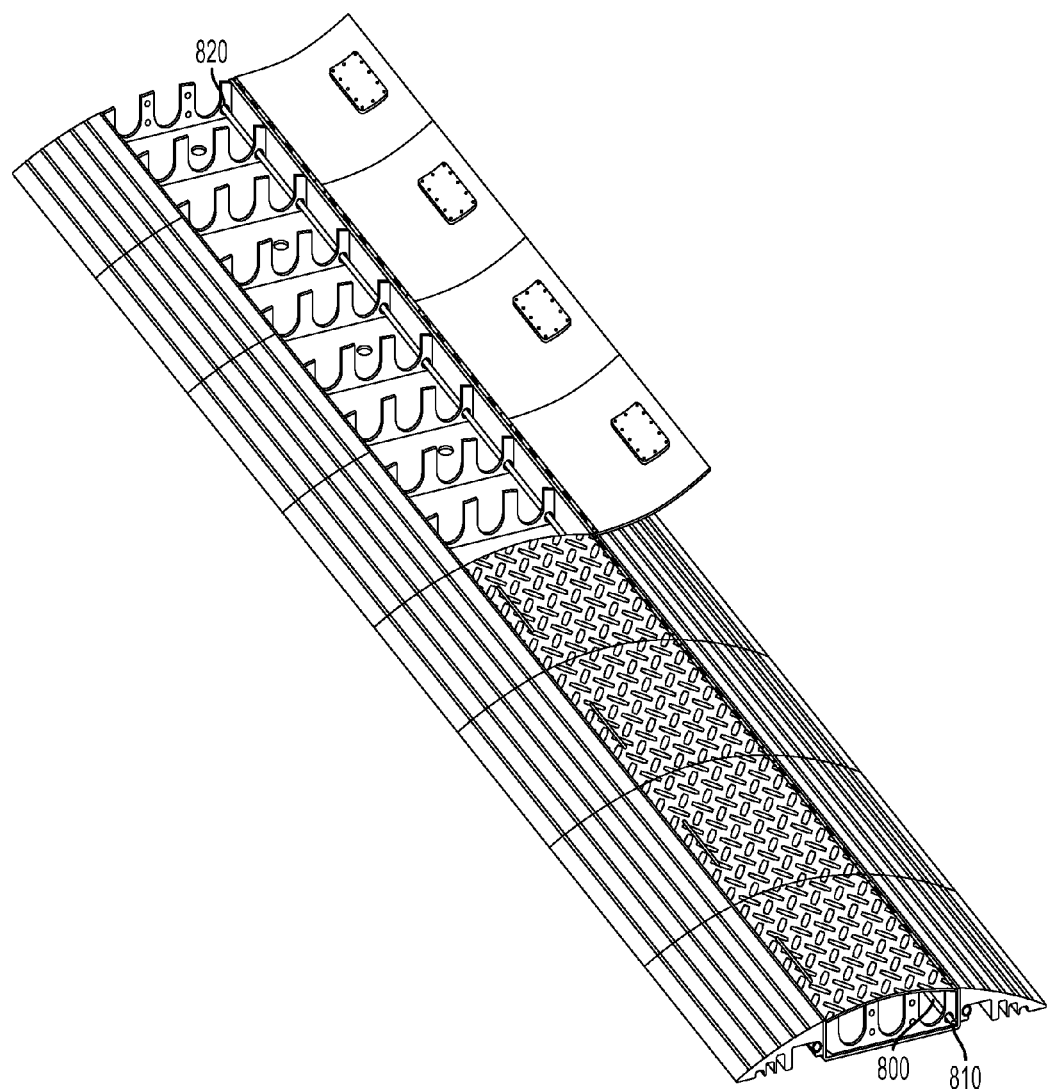
FIG. 13 is a perspective view of an assembled modular cable and conduit protection system.

Each cross member of the plurality of cross members preferably has a plurality of grooves (160) spaced intermittently therein. Each groove will have a groove length (161), a groove width (162) and a groove height (163). In a preferred embodiment each of the plurality of cross members will have the same number of grooves spaced in the same configuration and having similar groove length, groove width and groove height dimensions as seen in FIG. 2. Preferably the cables and conduits (500) will lie inside the plurality of grooves as shown in FIG. 11. Where the cables and conduits lie inside the plurality of grooves it is preferred that the plurality of grooves further comprise a trim material of rubber, plastic or composite material running the length and width of each groove to protect the cables and conduits from wearing.

In a preferred embodiment the plurality of cross members includes a first end cross member (170) and a second end cross member (175). The first end cross member is joined in a unitary manner or connected to the channel at or near the channel bottom first end, the channel first side first height edge and the channel second side first height edge. The second end cross member is joined in a unitary manner or connected to the channel at or near the channel bottom second end, the channel first side second height edge and the channel second side second height edge. The first end cross member and the second end cross member preferably have the same number of grooves spaced in the same configuration and having similar groove length, groove width and groove height dimensions as the plurality of cross members. Additionally, the first end cross member and the second end cross member preferably have a plurality of connecting holes (172 and 177 respectively) by which two of the cable and conduit modular sections can be connected by nuts (910) and bolts (900), screws or other connecting devices.

Among other things, the plurality of cross members, the first end cross member and the second end cross member will provide structural support for the lid. In this respect, it is preferred that at least three of the cross members provide structural support for the lid.

In one embodiment, the channel comprises a plurality of drainage holes (185). The plurality of drainage holes can be located in the channel bottom, the channel first side, the channel second side, the first end cross member, the second end cross member or any combination thereof. In a preferred embodiment the plurality of drainage holes are located in the first end cross member and/or the second end cross member as shown in FIG. 6. In a more preferred embodiment the plurality of drainage holes are located at the corners of the first end cross member and/or the second end cross member corresponding to the junction between the end cross member length dimension and the end cross member width dimension. The plurality of drainage holes may have a variety of sizes and shapes.

In one embodiment, the channel further comprises a plurality of affixing holes (190). The plurality of affixing holes are located in the channel bottom and pass from the top surface of the channel bottom through the channel bottom plane to the bottom surface of the channel bottom. The plurality of affixing holes are included to allow for an affixing device such as a nail, a stake or a bolt to be placed through the channel bottom into the ground.

In one embodiment each channel further comprises at least one section of cable (700) having a cable first end (710) and a cable second end (720) which is the cable end opposite of the cable first end. In another embodiment each channel comprises at least one section of conduit (800) having a conduit first end (810) and a conduit second end (820) which is the conduit end opposite of the conduit first end. In another embodiment each channel comprises at least one section of cable and at least one section of conduit. In such embodiments each of the plurality of cross members will comprise a plurality of cable and conduit holes (600). Preferably each of the plurality of cable and conduit holes will comprise a grommet of a rubber, plastic or composite material to protect the cables and conduits from wearing. The plurality of cable and conduit holes will pass from the cross member front side through the cross member plane to the cross member back side. Where each channel comprises at least one section of cable and/or at least one section of conduit, the section of cable and/or section of conduit will run from the first end cross member, through the plurality of cross members to the second end cross member. Where each channel comprises at least one section of cable, each section of cable preferably includes two cable connectors where the first cable connector is located at the cable first end and is connected to the first end cross member; and the second cable connector is located at the cable second end and is connected to the second end cross member. Preferred cable connectors include any cable connector which can be quickly disconnected such as those available from Amphenol Corporation of Wallingford Connecticut, USA. Where each channel comprises at least one section of conduit, each section of conduit preferably includes two conduit connectors where the first conduit connector is located at the conduit first end and is connected to the first end cross member; and the second conduit connector is located at the conduit second end and is connected to the second end cross member. Preferred conduit connectors include any conduit connector which can by disconnected without product loss such as Kamvalok® couplers available from OPW Engineered Systems of Cincinnati Ohio, USA.

In one embodiment the first ramp (200) comprises a first ramp bottom (210), a first ramp sidewall (220) and a first ramp inclined wall (230). The first ramp bottom lies in a plane substantially parallel to the ground and is preferably rectangular in shape having a first end, a second end, a first edge, a second edge and a bottom surface with the first end being opposite of the second end and adjacent to the first edge and the second edge. The first ramp sidewall preferably has a rectangular shape having a top edge, a bottom edge, a first height edge, a second height edge and an outer surface. The bottom edge of the first ramp sidewall is joined in a unitary manner or connected to the first edge of the first ramp bottom, and the first ramp sidewall extends vertically therefrom in a plane substantially perpendicular to the first ramp bottom. The first ramp inclined wall preferably has a rectangular shape having a top edge (232A), a bottom edge (232B), a first height edge (234A), a second height edge (234B) and a top surface. The bottom edge of the first ramp inclined wall is joined in a unitary manner or connected to the second edge of the first ramp bottom and extends therefrom to the top edge of the first ramp sidewall where the top edge of the first ramp inclined wall is joined in a unitary manner or connected to the top edge of the first ramp sidewall.

In one embodiment the second ramp (300) comprises a second ramp bottom (310), a second ramp sidewall (320) and a second ramp inclined wall (330). The second ramp bottom lies in a plane substantially parallel to the ground and is preferably rectangular in shape having a first end, a second end, a first edge, a second edge and a bottom surface with the first end being opposite of the second end and adjacent to the first edge and the second edge. The second ramp sidewall preferably has a rectangular shape having a top edge, a bottom edge, a first height edge, a second height edge and an outer surface. The bottom edge of the second ramp sidewall is joined in a unitary manner or connected to the first edge of the second ramp bottom, and the second ramp sidewall extends vertically therefrom in a plane substantially perpendicular to the second ramp bottom. The second ramp inclined wall preferably has a rectangular shape having a top edge (332A), a bottom edge (332B), a first height edge (334A), a second height edge (334B) and a top surface. The bottom edge of the second ramp inclined wall is joined in a unitary manner or connected to the second edge of the second ramp bottom and extends therefrom to the top edge of the second ramp sidewall where the top edge of the second ramp inclined wall is joined in a unitary manner or connected to the top edge of the second ramp sidewall.

Figure 3:
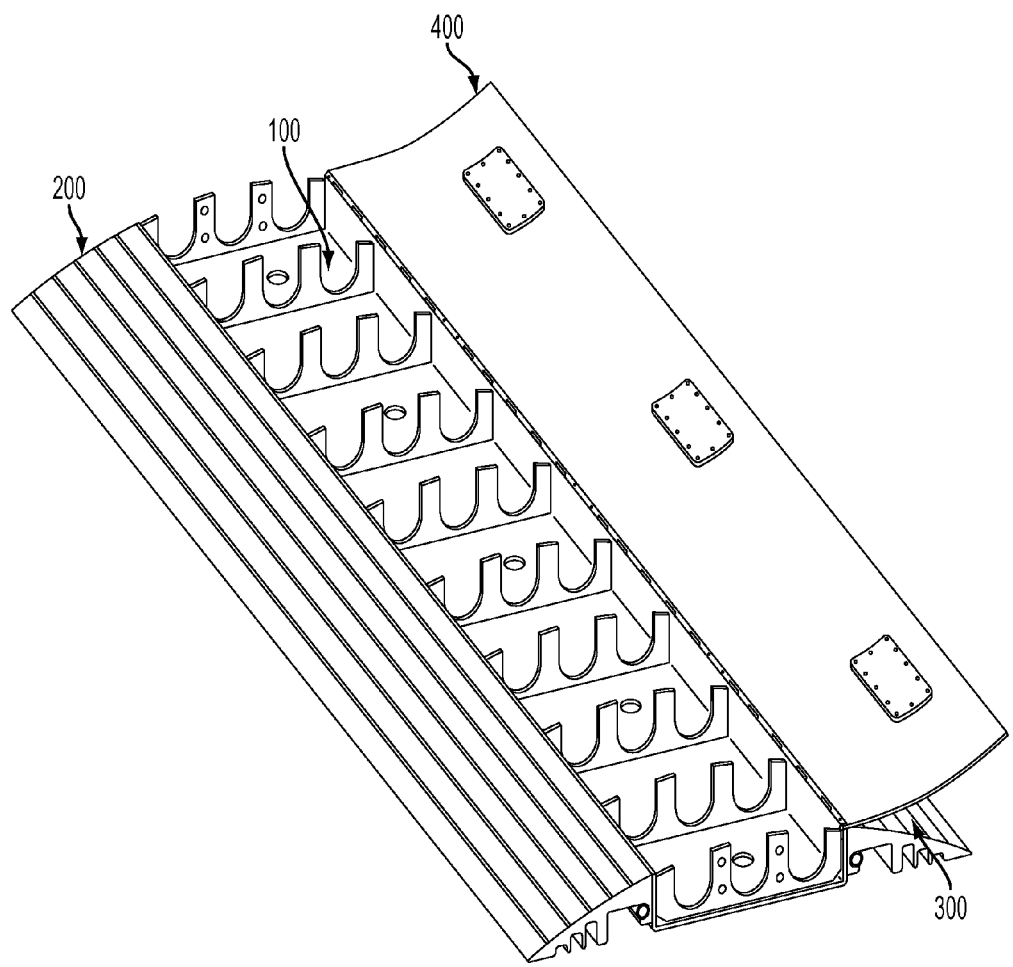
FIG. 3 is a perspective view of one embodiment of a cable and conduit protector section.
Figure 4:
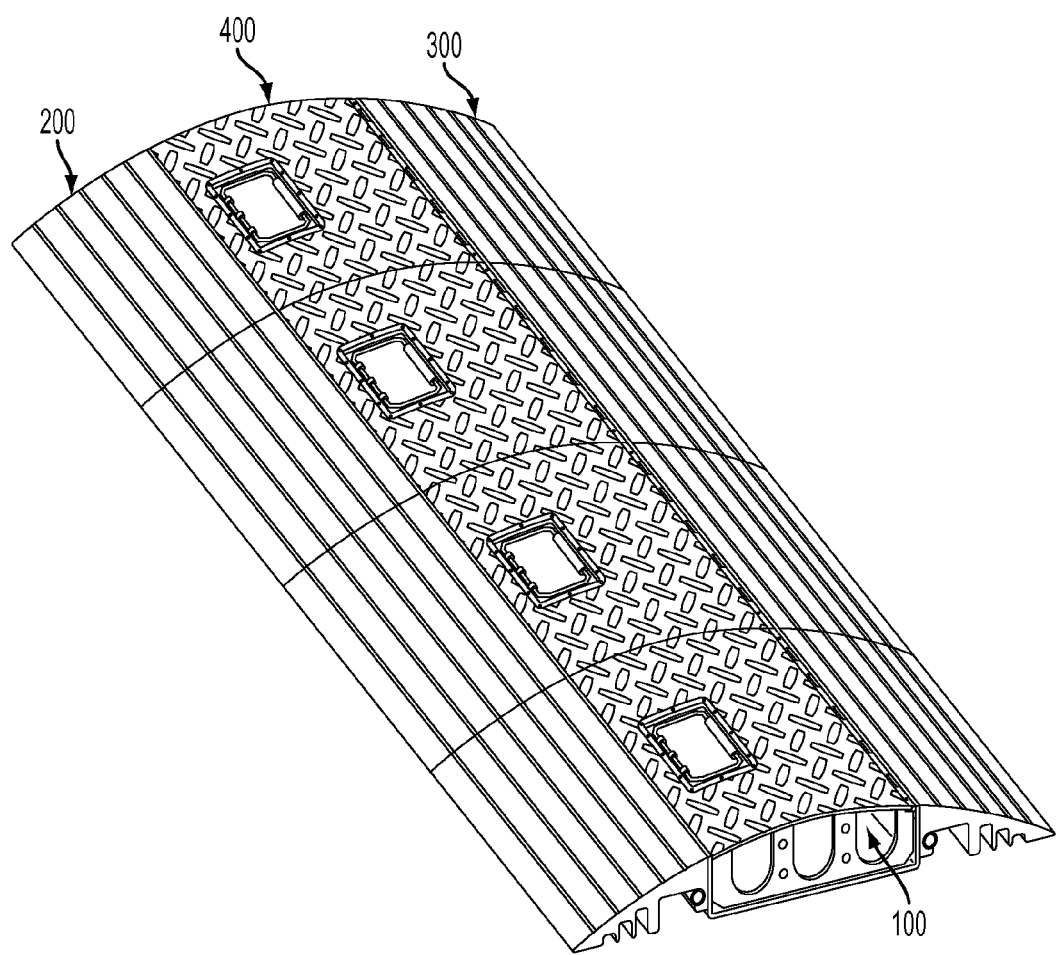
FIG. 4 is a perspective view of one embodiment of a cable and conduit protector section.
Figure 5:
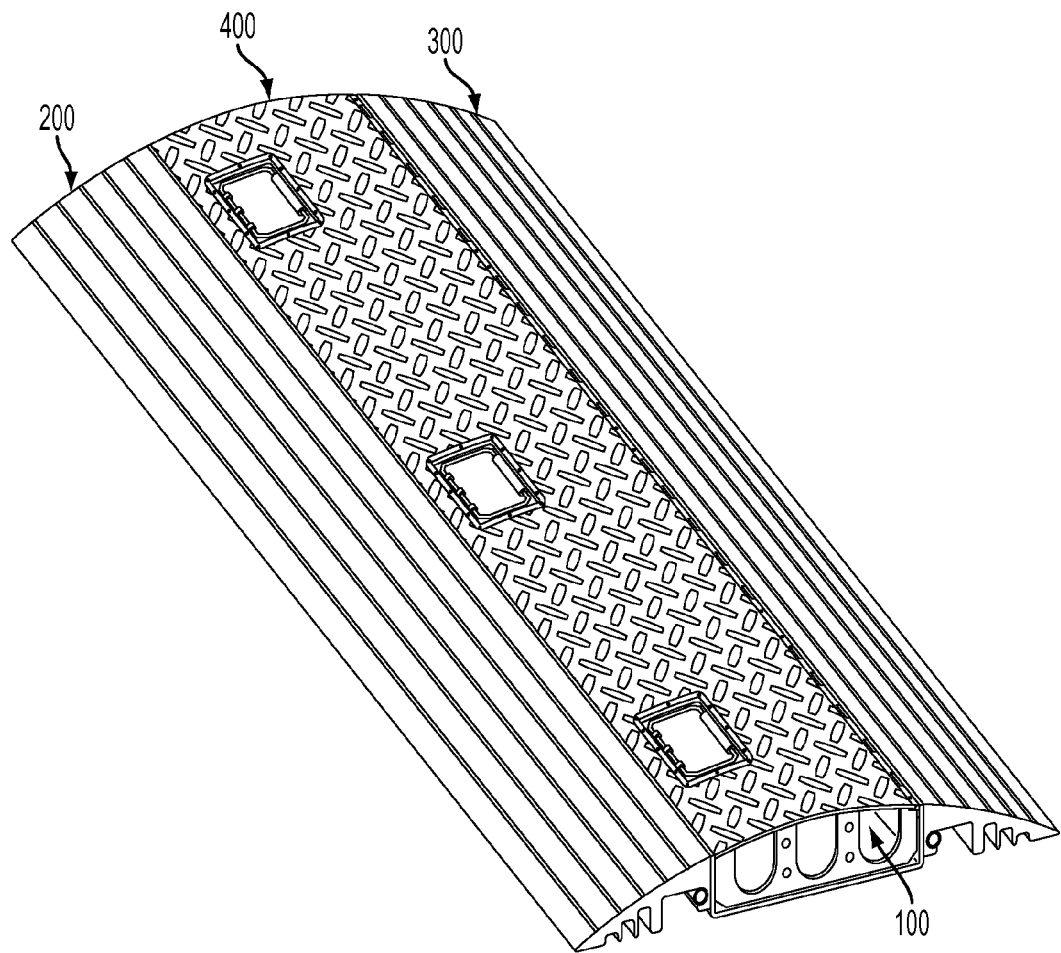
FIG. 5 is a perspective view of one embodiment of a cable and conduit protector section.

In a preferred embodiment, the first ramp and the second ramp have identical or nearly identical dimensions. In one embodiment, each modular section comprises only one first ramp and only one second ramp as shown in FIGS. 3 and 5. In a preferred embodiment, each modular section comprises more than one first ramp and more than one second ramp as shown in FIGS. 2 and 4.

In a preferred embodiment the first ramp sidewall and the second ramp sidewall further comprise a connecting tube (240 and 340 respectively) and a plurality of connecting holes. The connecting tube is cylindrical in shape and runs the length of the sidewall. The connecting tube may be fabricated metal such as steel, stainless steel or aluminum, or it may be a composite material. The connecting tube may be joined in a unitary manner to the sidewall such as by overmolding or connected to the sidewall through the use of fasteners such as nuts and bolts. The plurality of connecting holes pass through the connecting tube and the outer surface of the sidewall in a plane parallel to the ground. In a preferred embodiment the connecting holes of the first ramp sidewall are substantially aligned to the first channel sidewall connecting holes, and the connecting holes of the second ramp sidewall are substantially aligned to the second channel sidewall connecting holes.

In one embodiment the first ramp bottom and the second ramp bottom comprise a plurality of grooves or recesses. Each of the plurality of grooves or recesses begins from the bottom edge of the first ramp bottom and/or the second ramp bottom and extends upwardly in a plane that is substantially parallel to the first ramp sidewall and/or the second ramp sidewall. In one embodiment the plurality of grooves or recesses may be used to house one or more cables or conduits.

In one embodiment the lid (400) has a rectangular shape having a first end (410), a second end (420), a first edge (430), a second edge (440), a top side (450) and a bottom side (460) where the first end is opposite of the second end and adjacent to the first edge and the second edge. Preferably, the first end and the second end of the lid have an arched shape which provides for a lid having an arched surface spanning the length of the channel as seen in FIG. 6.

In one embodiment each modular section comprises one lid with the first edge of the lid being the same length as the first edge of the channel bottom and the second edge of the lid being the same length as the second edge of the channel bottom as shown in FIGS. 3 and 5. In a preferred embodiment, each modular section comprises more than one lid with the first edge of each lid being shorter than the length of the first edge of the channel bottom and the second edge of each lid being shorter than the length of the second edge of the channel bottom as shown in FIGS. 2 and 4. In an embodiment where each modular section comprises more than one lid, it is preferred that lids, when combined, span the entire length of the channel as shown in FIGS. 2 and 4.

In one embodiment the lid or lids further comprise a handle (470). In one embodiment the handle is a separate component that is joined in a unitary manner or connected to the top of the lid. In a preferred embodiment, the handle is a separate component connected to the top surface of the lid where the handle is recessed into the lid as shown in FIG. 2. One such recessed handle is a Style 3 Pull Handle available from Monroe Engineering, LLC of Auburn Hills, Mich., USA. In another embodiment, the handle is a hole passing from the top side of the lid through to the bottom side of the lid. The size and shape of the handle is not believed to be important except that the handle is preferably of sufficient size and adequate shape to allow one to grip the handle and thereby lift the lid.

The outer surface of the first ramp sidewall is connected to the outer surface of the channel first side. The outer surface of the second ramp sidewall is connected to the outer surface of the channel second side. Preferably the first ramp sidewall is connected to the channel first side and the second ramp sidewall is connected to the channel second side by a plurality of nuts and bolts with the each bolts passing through the channel side connecting holes and the ramp sidewall connecting holes.

Preferably the second edge of the lid is connected to the top edge of the channel second side in a manner such that the lid can be opened without physically removing the lid from the channel. One means of connecting the second edge of the lid to the top edge of the second side is by means of a hinge. (480). In one embodiment the second edge of the lid is connected to the top edge of the channel second side by two or more hinges spaced intermittently along the length of the second edge of the lid and the top edge of the channel second side. In a preferred embodiment the second edge of the lid is connected to the top edge of the channel second side by a single hinge running the entire length of the first edge of the lid and the top edge of the channel first side as shown in FIG. 2. In a preferred embodiment the hinge is affixed to the bottom side of the lid and the inner surface of the channel first side. Where each modular section comprises more than one lid it is preferred that each of the more than one lids has its own hinge.

In one embodiment the top surface of the lid, the top surface of the first ramp inclined wall and/or the top surface of the second ramp inclined wall may be a grip enhancing surface (250 and 350 respectively). The grip enhancing surface may be any surface that improves the traction of trucks or other equipment which may be driving over the modular cable and conduit protection system. A grip enhancing surface can be achieved by attaching a grip enhancing material such as sandpaper to the top surface of the lid, the top surface of the first ramp inclined wall and/or the top surface of the second ramp inclined wall. A grip enhancing surface can also be achieved by molding or carving a plurality of grooves or ridges into the top surface of the lid, the top surface of the first ramp inclined wall and/or the top surface of the second ramp inclined wall. In one embodiment the grip enhancing surface may be a diamond plate surface.

Figure 15:
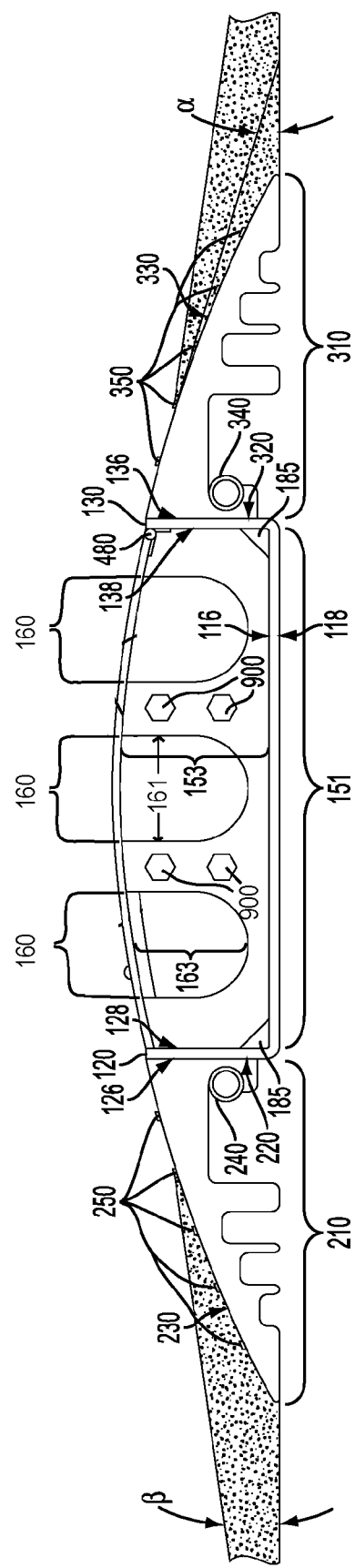
FIG. 15 is an end view of one embodiment of a cable and conduit protector section.

In order for trucks and equipment to easily drive over the ramp it is preferred that the angle formed at the junction of the ramp inclined walls and the ramp bottoms be as low as possible. Preferably, the angle formed at the junction of the ramp inclined walls and the ramp bottoms is less than 30°. It is further preferred to keep the height of the arched lid as low as possible while still providing sufficient arch to maintain structural stability and allow for maximum space inside the channel to house cables and conduits. By doing so, the approach angle of trucks and equipment can be reduced to a level that can easily be driven over by trucks and equipment, even at low speeds. If additional reduction in the approach angle is needed, it can be further achieved by piling gravel, rocks or sediment (50) on the first ramp and the second ramp as shown in FIG. 15.

In one embodiment the channel bottom first edge and the channel bottom second edge are curved outward from the center of the channel bottom. In such an embodiment it is preferred that the channel first side and the channel second side be arched in a manner that is substantially similar to the outward curve of the channel bottom first edge and the channel bottom second edge. In such an embodiment it is also preferred that the first ramp sidewall, the first ramp connecting tube, the second ramp sidewall and the second ramp connecting tube be curved inward in a manner that is substantially similar to the outward curve of the channel bottom first edge and the channel bottom second edge. In such an embodiment it is further preferred that the lid first edge and the lid second edge curve outward in a manner that is substantially similar to the outward curve of the channel bottom first edge and the channel bottom second edge. Finally, in such an embodiment it is preferred that the cross members have varying length dimensions such that cross members closer to the center of the channel have a greater length dimension to account for the greater distance between the first channel side and the second channel side at the center of the channel while the first end cross member, the second end cross member and the cross members closer to the channel first end and the channel second end have a lesser length dimension.

Types of material to be used for fabricating the channel, the first ramp, the second ramp and the lid include any materials of sufficient rigidity to withstand being driven over by large trucks, excavators and construction equipment. Materials believed sufficient include, but are not limited to, cast iron, steel, stainless steel, aluminum, titanium, rubbers, plastics and composite materials. In one embodiment, the channel and the lid are fabricated from the same material as the first ramp and the second ramp. In a preferred embodiment the channel and the lid are fabricated from a different material than the first ramp and the second ramp. Preferably the first ramp and the second ramp are fabricated from a material that weighs less than the material which the channel and the lid are fabricated from. For instance, the channel and lid may be fabricated from a metal such as steel or stainless steel while the first ramp and the second ramp are fabricated from rubber, plastic or composite material. One preferred metal for fabricating the channel and the lid is 409 Stainless Steel. Where the channel, the first ramp, the second ramp or the lid are made of rubber, plastic or composite material they may be molded using any of the known molding techniques such as compression molding, injection molding or extrusion molding. Where the channel, the first ramp, the second ramp or the lid are made of rubber it is preferred that the rubber be cured or vulcanized for additional strength using any of the known curing or vulcanization techniques.

Figure 14:
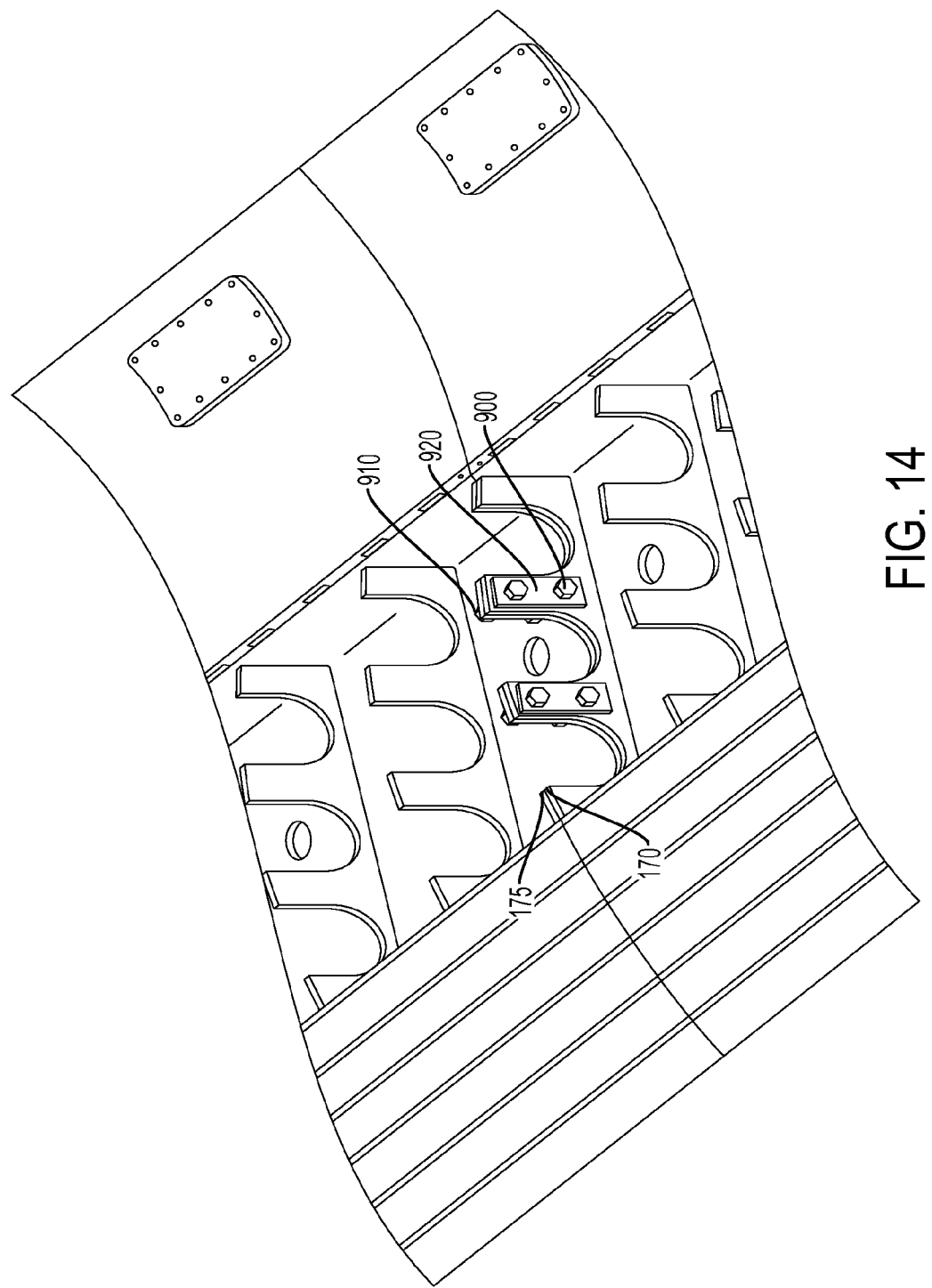
FIG. 14 is a close-up view of an assembled modular cable and conduit protection system.

The modular cable and conduit protection system is assembled by connecting two or more cable and conduit protector modular sections together end to end. Preferably the two or more cable and conduit protector modular sections are connected by a plurality of nuts and bolts. Preferably the each bolt of the plurality of bolts passes through one of the first end cross member connecting holes of one modular section and the corresponding second end cross member connecting hole of a different modular section. In a preferred embodiment each bolt is a "U" shaped dual bolt adjoined by a plate (920) as shown in FIG. 14.

Cables and conduits refers to any type of cable or conduit which may be found on a construction, excavation, mining, drilling or fracking site. As used herein and in the claims cables include power cables such as electrical cables as well as communications cables such as phone lines, fiber-optic cables and the like. As used herein and in the claims conduits include any pipe or tubing through which a liquid or gas may pass including high pressure conduits.

I claim:

1. A cable and conduit protector comprising:
a channel comprising a channel bottom, a first channel side comprising a plurality of first channel side connecting holes, a second channel side comprising a plurality of second channel side connecting holes, a plurality of cross members joined in a unitary manner to the channel bottom, the channel first side and the channel second side and spanning a distance between the channel first side and the channel second side with each of said cross members of the plurality of cross members comprising a plurality of grooves, a first end cross member joined in a unitary manner to the channel bottom, the channel first side and the channel second side and spanning the distance between the channel first side and the channel second side with the first end cross member comprising a plurality of first end cross member grooves and a plurality of first end cross member connecting holes to optionally connect the cable and conduit protector to a second cable and conduit protector, and a second end cross member joined in a unitary manner to the channel bottom, the channel first side and the channel second side and spanning the distance between the channel first side and the channel second side with the second end cross member comprising a plurality of second end cross member grooves and a plurality of second end cross member connecting holes to optionally connect the cable and conduit protector to a third cable and conduit protector;

a first ramp comprising a first ramp channel, a first ramp sidewall, a first ramp inclined wall, a first ramp connecting tube and a plurality of first ramp connecting holes passing through the first ramp connecting tube and the first ramp sidewall wherein the first ramp connecting holes are substantially aligned with the first channel side connecting holes wherein the first ramp sidewall, the first ramp connecting tube and the first channel side are connected;

a second ramp comprising a second ramp channel, a second ramp sidewall and a second ramp inclined wall, a second ramp connecting tube and a plurality of second ramp connecting holes passing through the second ramp connecting tube and the second ramp sidewall wherein the second ramp connecting holes are substantially aligned with the second channel side connecting holes, and wherein the second ramp sidewall, the second ramp connecting tube and the second channel side are connected; and a lid having an arched shape spanning the length of the channel, wherein the lid is connected to the second channel side and is supported by at least three cross members selected from the group consisting of the plurality of cross members including the first and second end cross members.

2. The cable and conduit protector of claim 1, wherein the channel further comprises a plurality of drainage holes located in the channel bottom, the first channel side, the second channel side, the first end cross member, the second end cross member or any combination thereof.

3. The cable and conduit protector of claim 1, wherein the channel further comprises a plurality of affixing holes located in the channel bottom.

4. The cable and conduit protector of claim 1, wherein the channel further comprises at least a section of cable comprising a cable first end and a cable second end.

5. The cable and conduit protector of claim 4, wherein each section of cable of the at least a section of cable comprises a first cable connector located at the cable first end and a second cable connector located at the cable second end.

6. The cable and conduit protector of claim 1, wherein the channel further comprises at least a section of conduit comprising a conduit first end and a conduit second end.

7. The cable and conduit protector of claim 6, wherein each section of conduit of the at least a section of conduit comprises a first conduit connector located at the conduit first end and a second conduit connector located at the conduit second end.

8. The cable and conduit protector of claim 1, wherein the first ramp comprises a plurality of first ramp sections.

9. The cable and conduit protector of claim 1, wherein the second ramp comprises a plurality of first ramp sections.

10. The cable and conduit protector of claim 1, wherein the lid comprises a plurality of lid sections.

11. The cable and conduit protector of claim 1, wherein the first ramp, the second ramp, the lid or any combination thereof further comprises a grip enhancing surface.

12. The cable and conduit protector of claim 11, wherein the grip enhancing surface is a diamond plate surface.

13. The cable and conduit protector of claim 1, wherein the channel, the first ramp, the second ramp and the lid are each fabricated from a type of material selected from the group consisting of cast iron, steel, stainless steel, aluminum, titanium, rubber, plastic or composite materials.

14. The cable and conduit protector of claim 13, wherein the channel, the lid, the first ramp and the second ramp are fabricated from the same type of material.

15. The cable and conduit protector of claim 1, wherein the lid further comprises a handle.

16. The cable and conduit protector of claim 15, wherein the handle is recessed into and connected to the lid.

17. The cable and conduit protector of claim 15, wherein the handle is a hole.

18. The cable and conduit protector of claim 1, wherein the lid is connected to the channel second side by a hinge.

19. The cable and conduit protector of claim 1, wherein the first ramp sidewall is connected to the first channel side by a plurality of first ramp nuts and bolts passing through the first channel side connecting holes and the first ramp connecting holes.

20. The cable and conduit protector of claim 1, wherein the second ramp sidewall is connected to the second channel side by a plurality of second ramp nuts and bolts passing through the second channel side connecting holes and the second ramp connecting holes.

* * * * *